United States Patent [19]

Whewell

[11] Patent Number: 5,258,048
[45] Date of Patent: * Nov. 2, 1993

[54] FUEL COMPOSITIONS COMPRISING FULLERENES

[76] Inventor: Christopher J. Whewell, 11631 Lyman Rd., Chesterland, Ohio 44026-1825

[*] Notice: The portion of the term of this patent subsequent to Aug. 10, 2010 has been disclaimed.

[21] Appl. No.: 895,281

[22] Filed: Jun. 8, 1992

Related U.S. Application Data

[63] Continuation-in-part of Ser. No. 717,648, Jun. 19, 1991.

[51] Int. Cl.$^5$ ............................. C10L 1/22; C10L 1/00
[52] U.S. Cl. ........................................ 44/282; 44/314; 44/412; 44/628
[58] Field of Search ................. 44/314, 412, 628, 300, 44/282

[56] References Cited

PUBLICATIONS

Guo, "Doping Bucky ...", *Journal of Physical Chemistry*, pp. 4948–4950, Jun. 1991.
Chai, "Fullerenes with Metals Inside", *ACS Journal*, 1991.

*Primary Examiner*—Jacqueline V. Howard
*Attorney, Agent, or Firm*—Christopher Whewell

[57] ABSTRACT

Fuel compositions for internal combustion engines comprising a gasoline, a hydrocarbon-soluble allotropic form of carbon, and optionally a dispersing agent are provided. Two-cycle engines operated utilizing the fuel compositions provided herein emit lessened amounts of undesirable hydrocarbon exhaust gas emissions.

22 Claims, No Drawings

FUEL COMPOSITIONS COMPRISING FULLERENES

CROSS-REFERENCE TO RELATED APPLICATIONS

This application is a continuation-in-part of U.S. patent application Ser. No. 07/717,648, filed Jun. 6, 1991, which is currently still pending.

The subject matter of this application was described in Disclosure Document number 282,402 which was received May 20, 1991 in the United States Patent Office.

BACKGROUND OF THE INVENTION

It has been an ongoing goal of mankind to continuously design improved system by which potential energy, in the form of a hydrocarbon-based fuelstock, may be converted into useful work. Presently, the world's automotive industries are attempting to develop more efficient combustion engines which at the same time release decreased levels of undesirable gaseous emissions during their operation. The instant invention relates to fuel compositions for use in internal combustion engines. The compositions disclosed herein are suitable for use in four cycle engines, and are especially suitable for operating two-cycle combustion engines.

By far the most common type of combustion engine presently in popular usage is the four-cycle gasoline engine. During its normal operation, four strokes or motions of the piston and connecting rod assembly in the cylinder bore comprise one complete engine cycle. These strokes are: 1) Fuel-air intake stroke, 2) compression stroke, 3) power stroke, and 4) exhaust stroke. This cycle is repeated at a constant or varied rpm in order to provide a useful work output at the crankshaft. One of the drawbacks of the four-cycle engine is that only one power stroke occurs during every two revolutions of the crankshaft to which the piston and its connecting rod are attached. Such cyclic motion causes a significant amount of friction to be generated between moving components during normal engine operation, with attendant waste of some of the fuel's energy as dissipated heat.

Two-cycle engines, on the other hand produce one power stroke for every one revolution of the crankshaft. Typical operation is as follows: On the upstroke of the piston a partial vacuum is created in the crankcase and the piston is simultaneously caused to uncover a fuel mixture inlet port forcing the fuel mixture to enter the crankcase. This occurs while the charge currently in the cylinder is being compressed. The compressed charge is then fired and the piston decends on its power stroke, compressing the mixture in the crankcase. At the bottom of the power stroke, the piston uncovers the exhaust port(s) and fuel transfer ports. The exhaust gasses exit the engine while fresh fuel mixture is admitted to the cylinder. The cycle then repeats.

For two cycle engines conventional fuel mixtures comprise gasoline and a soluble lubricating additive such as a petroleum oil in a ratio of about 16 parts gasoline to 1 part of lubricating additive. Many different lubricating additives are currently available under the generic name of "2-cycle engine oil". The 2-cycle engine oils which are available and which are well known in the prior art may contain one or more of the following additives: anti-oxidant, corrosion inhibitor, detergent, metal deactivator, anti-icing agent, intake system deposit control additive, anti-surface ignition agent, biocide, dispersant, demulsifying agent, and lubricating oil. One of the requirements of fuel compositions for two-cycle engines is that they provide for sufficient lubrication of the moving engine components so as to avoid engine seizure and undue wear while preventing build-up of carbon deposits in the combustion chamber, piston ring sticking, and problems associated with storage of the engine. Examples of prior art U.S. patents pertaining to two-cycle engine fuels include: U.S. Pat. Nos. 2,896,593; 3,004,837; and 3,753,905.

From a manufacturing standpoint, an advantage of using a conventional two-cycle fuel mixture is that no oil flow passages must be cast in or machined in the engine block and that no oil recirculation pump is required. Therefore the cost of manufacturing two cycle engines is considerably less when compared to four-cycle engines. Also, since the engine delivers one power stroke per engine revolution using fewer moving parts, efficiency of energy conversion is increased while less friction is generated. Although the total cost per gallon of the fuel employed may be increased significantly through use of the instant invention, the benefits reaped in terms of increased fuel economy and the economics of engine manufacture shall make it cost effective overall.

The major disadvantage of combusting two-cycle fuel mixtures and the main reason why these types of engines do not enjoy the same popularity as their four-stroke counterparts is that the amount of carbon monoxide, nitrogen oxides, and particularly unburned hydrocarbons emitted during their operation is too great for the current emmission standards maximum levels imposed by the US EPA and other similar organizations worldwide even when state-of-the-art catalytic convertors are utilized. Obviously, if it were possible to reduce the level of undesirable emissions while maintaining sufficient lubrication for normal engine operation, then the automotive industries and society as a whole would benefit greatly.

SUMMARY OF THE INVENTION

In accordance with the present invention, the problems associated with the high amounts of undesirable exhaust gas emissions of two-cycle engines operated using conventional fuel mixtures are greatly reduced by partial or complete substitution of the lubricating component of a prior art two-cycle engine fuel composition by a gasoline-soluble or dispersable Buckminsterfullerene.

"Buckminsterfullerenes" (or simply "fullerenes" as they shall be herein referred to) are a general class of molecular allotropic forms of carbon which contain between about 28 and 120 carbon atoms per molecule wherein the carbon atoms are bonded to one another in such a fashion that the shape of the molecule which they collectively form has the geometry of a truncated icosahedron. Perhaps the most common and stable of all of these allotropic homonuclear fullerenes is the one which contains 60 carbon atoms. This molecule was described in the publication entitled, "Nature" in volume 318, page 162, (November 1985). This and other analogous fullerenes are described in the following publications, and essential matter contained therein is herein incorporated by reference: "Chemical and Engineering News", Oct. 29, 1990 issue, pages 22–25; "Journal of Physical Chemistry" Vol. 94, pages 8634–8636

(1990); Nature, Volume 350, Mar. 7, 1991; and "Scientific American", October 1991 issue.

A mixture of fullerenes which contain between 28 and several hundred carbon atoms per molecule can be obtained by evaporating pure graphite electrodes in an atmosphere of helium at a pressure of about 100 Torricelli. Of the carbon soot which condenses on the walls of that apparatus which houses such electrodes, about 10 percent of it is hydrocarbon-soluble, and most of this soluble residue is composed of the fullerenes which comprise 60 and 70 carbon atoms.

I have discovered that when a mixture containing the C-60 and the C-70 Buckminsterfullerenes in a weight ratio of about 90/10 respectively is dissolved in 89 octane motor gasoline, that in addition to changing the color of the gasoline, the Buckminsterfullerenes impart a heretofore unobserved quality to the gasoline which makes it particularly suitable for use as a two-cycle engine fuel additive. It was subsequently found that a two-cycle engine suffered no noticable abnormal wear and appeared to function normally when more than ⅔ of the conventional lubricative component of its fuel was removed and replaced by the Buckminsterfullerene mixture. During engine operation, the levels of undesirable exhaust gas components emitted were very noticably reduced as the characteristic blue smoke and odor which is normally associated with a two-cycle engine during its operation was not observed.

One object of the present invention is to provide a fuel composition which allows for reduced exhaust emissions of two cycle engines during their normal operation.

Since the fullerene present in the fuel compositions of this invention cause the color of the gasoline employed to change, the need for adding an identifying dye to the gasoline for identification purposes (as is well known by those skilled in the art) is alleviated. This is another advantage of the fuel compositions of this invention.

DESCRIPTION OF THE INVENTION

The fuels contemplated for use in the fuel compositions of the present invention are normally liquid hydrocarbon fuels in the gasoline boiling range, including hydrocarbon base fuels. The term "petroleum distillate fuel" also is used to describe the fuels which can be utilized in the fuel compositions of the present invention and which have the above characteristic boiling points. The term is, however, not intended to be restricted to straight-run distillate fractions. The distillate fuel can be straight-run distillate fuel, catalytically or thermally cracked (including hydrocracked) distillate fuel, or a mixture of straight-run distillate fuel, naphthas and the like with cracked distillate stocks. Also, the base fuels used in the formulations of the fuel compositions of the present invention can be treated in accordance with well-known commercial methods such as acid or caustic treatments, hydrogen solvent refining, clay treatment, etc.

Gasolines are supplied in a number of different grades depending upon the type of service for which they are intended. The gasolines utilized in the present invention include those designed as motor and aviation gasolines. Motor gasolines include those defined by ASTM specification D-439-73 and are composed of a mixture of various types of hydrocarbons including aromatics, olefins, paraffins, isoparaffins, naphthalenes, and occasionally diolefins. Motor gasolines normally have a boiling range within the limits of about 20 degrees C to about 230 degrees C., while aviation gasolines have narrower boiling ranges, usually within the limits of about 37 degrees C. to 165 degrees C.

A motor fuel's octane number is a rating of its resistance to knocking or detonation in a spark-ignition engine. Generally speaking it is desirable to employ highly branched alkanes such as isooctane or 2,2,4,4 tetramethyl pentane since such fuels promote slow and even travel of the advancing flame front from the spark plug to the outer perimeters of the combustion chamber during combustion of the fuel charge. Straight chain, less branched alkanes tend to burn more rapidly and are generally undesirable. For example, isooctane, by definition, has an octane rating of 100, and n-heptane has an octane rating of 0. A 50/50 mixture of these materials will have an octane rating of 50. Unfortunately, highly desirable branched fuelstocks are not produced in high enough quantity using current refining technology, and prior art and current practice has leaned towards the use of fuel additives to increase octane ratings. In the past, organolead compounds such as tetra-ethyl and tetra-methyl lead, and mixtures thereof have been employed, as well as MMT (methylcyclopentadienyl manganese tricarbonyl), and most recently oxygenates such as MTBE (methyl tertiarybutyl ether).

There are several ways to measure a fuel's octane rating. The methods generally include the research octane number (RON) and the motor octane number (MON). For the RON, a special laboratory variable compression ratio engine is used to derive octane ratings under conditions of constant load, constant engine RPM, and using a cold intake manifold. The RON is not very indicative of what would be encountered by an actual engine in use. The MON on the other hand is measured in the test engine under variable load and RPM, using a hot intake manifold. This test gives more realistic values, which are generally much lower than the RON numbers obtained for the same base fuel. The government has mandated the use of an average of the RON and MON numbers for rating motor fuels, and the method is widely known as the "(R+M)/2" method.

The terms "Buckminsterfullerene" and "fullerene" are synonymous, and as used in this specification and the appended claims these terms mean a general class of molecules which exist essentially in the shape of truncated icosahedra, which contain from 28 to 94 carbon atoms, and which comprise carbon atoms as the predominant atomic moiety from which they are composed. This definition includes but is not limited to the allotropic Buckminsterfullerenes such as C-28, C-32, C-44, C-50, C-58, C-60, C-70, C-84, and C-94. (According to this nomenclature, the fullerene which contains 60 carbon atoms is denoted C-60, the fullerene which contains 70 carbon atoms is denoted C-70, etc.) Also included in this definition for purposes of the instant invention are the substituted fullerences. These are molecular fullerenes which have had one or more of the atoms which comprise the fullerene cage structure replaced by an atom other than carbon, which essentially retain the geometry of a truncated icosahedron upon being so substituted, and retaining physical properties such as solubility or dispersibility in motorgasolines. Accordingly, the fullerene known as $C_{59}B$, wherein one of the carbon atoms of C-60 has been replaced by a boron atom, belongs to this class of substituted fullerenes.

Perhaps the main criteria for usefulness in this invention is that the fullerences must be sufficiently soluble or dispersible in the fuelstock, must possess sufficient properties to prevent engine seizure when employed as a fuel additive as taught herein, and should not produce undesirable carbon deposits to build up in the upper cylinder area. Therefore, many fullereness and substituted fullerenes are anticipated as being useful in the instant invention, as long as these criteria can be met. Substituted buckminsterfullereness which contain one or more boron atoms, or one or more nitrogen atoms as a part of the fullerene cage structure of the fullerene molecule are herein indicated as having utility in the instant invention, as long as either solubility or dispersibility requirements are met. While the exact chemical structures and the nature of the chemical bonding in the substituted fullerenes is not completely understood, it is currently believed that the exact positions of two of the same atoms, for example boron atoms, in a di-substituted fullerene are not controlling over the effects produced by the presence of such a species in the fuelstock. Otherwise stated, the beneficial effects produced using the additives of this invention are qualitative to the presence of the molecule as a whole, and not to the relative positions of the substututed atoms of the substituted fullerene with respect to one another. It is believed that many of the general requirements of a two-cycle fuel, for example, of not allowing carbon deposits to build up, can be circumvented through the use of additive chemistry known to those skilled in the art.

The fuel compositions of the present invention comprise elemental carbon in at least one of its fullerene forms, a motor gasoline, and optionally, a dispersant. The currently preferable form of fullerene for use in the fuel compositions of the present invention is the soluble portion of the material obtained when graphite electrodes are electrically evaporated in a stream of an inert atmosphere such as helium. The mixture of fullerenes obtained in this process when pure graphite is employed as the material being vaporized principally comprises the C-60 and C-70 structures, and it is these species which impart the beneficial characteristics to the base motor fuels upon being incorporated therein.

The C-60 and C-70 fullerene allotropes are separable using chromatographic methods, but such procedures add to the cost of the fuel compositions of the present invention. Since no obvious deleterious effects were observed when the mixture of allotropes was utilized when compared to when pure C-60 and pure C-70 were used, there presently is forseen no reason for separating these species and excluding one or the other from the fuel compositions.

Since gasolines vary from refiner to refiner with respect to such components as total aromatic content, oxygenate content, additive content, etc., it may be necessary in some cases to include in the fuel compositions polymeric dispersants which would tend to assist in keeping the fullerenes in solution or in increasing the solubility of the fullerenes in a given gasoline. A large number of polymeric dispersants are herein indicated as being useful in and such polymeric dispersants are useful in the fuel compositions of the present invention. Often, such additives have been described as being useful in lubricating formulations as viscosity index improves with dispersing characteristics. The polymeric dispersants are generally polymers or copolymers having a long carbon chain and containing polar groups to impart the dispersancy characteristics. Polar groups which are useful in this regard include amines, imines, imides, hydroxyl, etc. For example, the polymeric dispersants may be copolymers of methacrylates or acrylates containing additional polar groups or vinyl acetatefumaric acid ester copolymers.

Many such polymeric dispersants have been described in prior art. The following are U.S. patents which describe polymeric dispersants: U.S. Pat. Nos. 4,402,844, 3,356,763, and 3,891,721. Other polymers which may be useful as dispersants in the fuels in this invention are described in the following U.S. Pat. Nos. 3,687,849, 3,687,905, 4,476,283, 4,181,618, 3,243,481, 3,723,575, 3,475,514, 4,026,167, 4,085,055, 4,409,120, 4,077,893, 4,358,565, 4,141,847, 4,346,193, and 4,160,739. Essential matter contained in all patents cited in this specification, including those just listed, is herein incorporated by reference.

U.S. Pat. No. 4,402,844 describes nitrogen-containing copolymers prepared by the reaction of lithiated hydrogenated conjugated dienemonovinylmonoarene copolymers with substituted aminolactams. U.S. Pat. No. 3,356,763 describes a process for producing block copolymers of dienes such as 1,3-butadiene and vinyl aromatic hydrocarbons such as ethyl styrenes. U.S. Pat. No. 3,891,721 describes block polymers of styrene-butadiene-2-vinylpyridine. A popular class of polymeric dispersants which has been known in the prior art for decades may be prepared by grafting polar monomers to a polyolefinic substrate. For example, U.S. Pat. Nos. 3,687,849 and 3,687,905 describe the use of maleic anhydrides as a graft monomer to a polyolefinic substrate. Maleic acid or its anhydride is commonly used as a graft monomer because of its low cost and the convenience it provides in allowing one to incorporate dispersant nitrogen compounds into polymers by further reaction of the carboxyl groups of the maleic acid or anhydride with, as an example, nitrogen compounds or hydroxy compounds. U.S. Pat. No. 4,160,739 describes graft copolymers obtained by the grafting of a monomer system comprising maleic acid or anhydride and at least one other different monomer which is addition copolymerizable therewith, the grafted monomer system then being post-reacted with a polyamine. The monomers which are copolymerizable with maleic acid or anhydride are any alpha, beta-monoethylenically unsaturated monomers which are sufficiently soluble in the reaction medium and are reactive towards maleic acid or anhydride so that substantially larger amounts of maleic acid or anhydride can be incorporated into the grafted polymeric product. Suitable monomers include esters, amides and nitriles of acrylic and methacrylic acids and monomers containing no free acid groups. The inclusion of heterocyclic monomers into graft polymers is described by a process which comprises a first step of graft polymerizing an alkyl ester of acrylic acid or methacrylic acid, slone or in combination with styrene, onto a substrate copolymer which is a hydrogenated block copolymer of styrene and a conjugated diene having 4 to 6 carbon atoms to form a first graft copolymer. In the second step, a polymerizable heterocyclic monomer, alone or in combination with a hydrophobizing vinyl ester is copolymerized onto the first graft copolymer to form a second graft copolymer.

The hydrocarbon-soluble phenolic dispersants useful in the fuel compositions of the present invention include the hydrocarbon-substituted phenolic compounds wherein the hydrocarbon substituents have a molecular weight which is sufficient to render the phenolic compound fuel soluble. Generally, the hydrocarbon substituent will be a substantially saturated, hydrocarbon based group of at least about 30 carbon atoms.

Also useful in the fuel compostions of the present invention are fuel-soluble alkoxylated derivates of alcohols, phenols, and amines. A wide variety of such derivatives can be utilized so long as the derivatives are soluble in the fuel employed. As is well known to those skilled in the art, the solubility characteristics of the alkoxylated derivatives of phenols, alcolhols, and amines can be controlled by proper selection of molecular moieties. Examples of commercially available alkylene oxide derivatives which may be used as dispersants in the fuel compositions of the instant invention are: Ethomeen S/12, tertiary amines of ethylene oxide condensation products of the primary fatty amines (Armak Industries), and Plurafac A-24, an ethoxylated straight chain alcohol available from BASF Wyandotte Industries.

A number of acylated, nitrogen-containing compounds having a substituent of at least 10 aliphatic carbon atoms and made by reacting a carboxylic acid acylating agent with an amino compound are known to those skilled in the art. In such compositions the acylating agent is bonded to the amino compound through an imido, amido, amidine, or acyloxy ammonium linkage. The substituent of at least 10 aliphatic carbon atoms may be in either the carboxylic acid acylating agent derived portion of the molecule or in the amino compound derived portion of the molecule. The acylating agent can vary from formic acid and its acylating derivatives to acylating agents having high molecular weight substituents of up to 20,000 carbon atoms. The amino compounds can vary from ammonia itself to amines having aliphatic substituents of up to about 30 carbon atoms.

In cases where the fuel compositions of the present invention are to be exposed to ultraviolet light for any extended time, additives such as ultraviolet light absorbers (UVA) or hindered amine light stabilizers (HALS) may function to retard any reaction between the fullerene and the components of the gasoline. Again, this will depend upon the relative amounts of various components present in the gasoline used in the fuel composition. Examples of hindered amine light stabilizers are: 1) Dimethyl succinate polymer with 4-hydroxy-2,2,6,6-tetramethyl-1-piperidine ethanol, and 2) N,N'-bis(2,2,6,6,-tetramethyl-4-piperidinyl)-1,6-hexanediamine polymer with 2,4,6-trichloro-1,3,5-triazine and 2,4,4-trimethyl-1,2-pentamine. An example of a UV absorber is 2-Hydroxy-4-n-octyloxy benzophenone.

The fuel compositions of the present invention can be prepared by either adding the individual components to gasoline, or by adding a fullerene concentrate to a quantity of gasoline sufficient to dilute the fullerene to the level desired. The concentrate preferably contains at least one fullerene and at least one dispersant of the type already set forth herein which is compatible with both the fullerene and the gasoline used. The following examples illustrate the fuel compositions in accordance with the present invention.

EXAMPLE 1

Unleaded gasoline is caused to remain in contact with a mixture of the C-60 and the C-70 Buckminsterfullerenes until saturated with the fullerenes. Then a volume of fresh unleaded gasoline equal to 5% by volume of the original amount of unleaded gasoline is added to the fullerene-laden gasoline. This fullerene-laden gasoline (which is nearly saturated with the fullerenes) is then blended with SAE 5W-30 motor oil in a volume to volume ratio of 50 parts of the gasoline to 1 part motor oil to produce a two-cycle engine fuel composition.

EXAMPLE 2

500 milliliters of a concentrate which contained 3.5 grams per liter of C-60 Buckminsterfullerene dissolved in toluene, and also containing a dispersant of the amino-succinnic acid grafted high-molecular weight polyisobutylene type, was diluted to 2 liters with Shell 89 octane regular pump gasoline to produce a fuel composition.

EXAMPLE 3

To the fuel composition of example 1 is added about 0.5% by weight of a hindered amine light stabilizer.

EXAMPLE 4

500 ml of a benzene solution containing 3 grams per liter of the C-60 allotropic Buckminsterfullerene and 0.4 grams of the C-70 Buckminsterfullerene is diluted to one gallon using 89 octane pump gasoline to form a fuel composition.

In addition to the additives of this invention, the use of other conventional fuel additives is contemplated. Thus the fuel compositions may also contain surface ignition suppressants, demulsifiers, dyes, gum inhibitors, oxidation inhibitors, and other additives already mentioned.

Consideration should be given to the fact that while this invention has been disclosed and described in relation to certain preferred embodiments, obvious equivalent modifications and alterations thereof will become apparent to those skilled in the art upon reading and understanding the specification. Accordingly, the presently disclosed invention is intended to cover all such modifications and alterations, and is limited only by the scope of the claims which follow.

I claim:

1. A fuel composition which comprises gasoline and at least one fullerene.

2. The fuel composition of claim 1 wherein said fullerene comprises an allotropic fullerene which contains between 28 and 120 carbon atoms.

3. The fuel composition of claim 1 wherein said buckminsterfullerene comprises an allotropic buckminsterfullerene selected from the group consisting of: C-60, C-70, C-74, C-82, C-84, and C-120.

4. The fuel composition of claim 1 wherein the total fullerene concentration is between about 0.1 and 3.5 grams per liter.

5. The fuel composition of claim 1 wherein the fullerene employed is a substituted fullerene.

6. The fuel composition of claim 1 wherein at least one of the carbon atoms of the cage structure of the fullerene has been replaced by an atom selected from the group consisting of: boron or nitrogen.

7. A fuel composition according to claim 1 wherein the octane rating of the gasoline employed is greater than about 70 as determined by the (R+M)/2 method.

8. A fuel composition as set forth in claim 1 and further comprising a hydrocarbon-soluble ashless dispersant.

9. The fuel composition of claim 8 wherein the dispersant is selected from the group consisting of:

i) at least one hydrocarbyl-substituted amine where the hydrocarbyl substituent is substantially aliphatic and contains at least 6 carbon atoms;
ii) at least one acylated, nitrogen-containing compound having a substituent of at least 10 aliphatic carbon atoms made by reacting a carboxylic acid acylating agent with at least one amino compound and

group, said acylating agent being linked to said amino compound through an imido, amido, amidine, or acyloxy ammonium linkage;
iii) at least one nitrogen-containing condensate of a phenol, aldehyde, and amino compound having at least one

group;
iv) at least one ester of a substituted carboxylic acid;
v) at least one polymeric dispersant;
vi) at least one hydrocarbon substituted phenolic dispersant;
vii) at least one fuel-soluble alkoxylated derivative of an alcohol, phenol, or amine.

10. The fuel composition of claim 9 ii wherein the amino compound is an alkylene polyamine of the general formula:

wherein U is an alkylene group of about 1 to about 18 carbon atoms, each $R^3$ is independently a hydrogen atom, an alkyl group, or a hydroxy alkyl group containing up to about 30 carbon atoms, with the proviso that at least one $R^3$ group is a hydrogen atom, and n is equal to about 1 to 10.

11. The fuel composition of claim 8 wherein the fullerene concentration is at least 0.1 grams per liter.

12. The fuel composition of claim 8 wherein the gasoline employed has an octane rating greater than about 70 as determined by the (R+M)/2 method.

13. The fuel composition of claim 8 wherein the fullerene employed is a substituted fullerene.

14. The fuel composition of claim 13 wherein the substituted fullerene comprises a fullerene in which at least one of the carbon atoms of the cage structure of the fullerene has been replaced by an atom selected from the group consisting of: boron or nitrogen.

15. A fuel composition as set forth in claim 8 wherein said fullerene comprises an allotropic fullerene which contains between 28 and 120 carbon atoms.

16. A fuel composition as set forth in claim 8 wherein said fullerene comprises an allotropic fullerene selected from the group consisting of: C-60, C-70, C-74, C-82, C-84, and C-120.

17. The process of operating an internal combustion engine by introducing into the combustion chamber a mixture comprising a gasoline and at least one fullerene.

18. A concentrate for use in preparing a fuel comprising a fullerene and a hydrocarbon-soluble ashless dispersant.

19. The concentrate of claim 18 wherein the fullerene comprises a fullerene selected from the group consisting of: C-60, C-70, C-74, C-82, C-84, and C-120.

20. The concentrate of claim 19 additionally containing a hydrocarbon solvent or diluent.

21. A fuel composition comprising gasoline and at least one fullerene wherein said fullerene is present in an effective lubricating amount.

22. A fuel composition comprising gasoline and a fullerene wherein said fullerene is present in an effective amount for changing the color of said gasoline.

* * * * *